(12) United States Patent
Mueller et al.

(10) Patent No.: US 11,219,964 B2
(45) Date of Patent: Jan. 11, 2022

(54) ULTRASONIC WELDING DEVICE

(71) Applicant: SCHUNK SONOSYSTEMS GMBH, Wettenberg (DE)

(72) Inventors: Stefan Mueller, Wetzlar (DE); Rainer Wagenbach, Merenberg (DE)

(73) Assignee: SCHUNK SONOSYSTEMS GMBH, Wettenberg (DE)

( * ) Notice: Subject to any disclaimer, the term of this patent is extended or adjusted under 35 U.S.C. 154(b) by 106 days.

(21) Appl. No.: 16/760,280

(22) PCT Filed: Oct. 10, 2018

(86) PCT No.: PCT/EP2018/077621
§ 371 (c)(1),
(2) Date: Apr. 29, 2020

(87) PCT Pub. No.: WO2019/091687
PCT Pub. Date: May 16, 2019

(65) Prior Publication Data
US 2020/0338663 A1 Oct. 29, 2020

(30) Foreign Application Priority Data
Nov. 10, 2018 (DE) ...................... 10 2017 220 079.0

(51) Int. Cl.
*B23K 20/10* (2006.01)
*B23K 101/06* (2006.01)

(52) U.S. Cl.
CPC ........ *B23K 20/106* (2013.01); *B23K 2101/06* (2018.08)

(58) Field of Classification Search
CPC .................. B23K 2101/06; B23K 1/06; B23K 20/10–106; B29C 65/08–088
(Continued)

(56) References Cited

U.S. PATENT DOCUMENTS 4,527,727 A * 7/1985 Renshaw ............ B29C 66/8242
228/1.1
4,842,671 A 6/1989 Nuss
(Continued)

FOREIGN PATENT DOCUMENTS

CN 101772866 A 7/2010
CN 107186332 A 9/2017
(Continued)

OTHER PUBLICATIONS

PCT International Search Report, PCT/EP2018/077621, dated Feb. 25, 2019, 7 pages.

*Primary Examiner* — Kiley S Stoner
(74) *Attorney, Agent, or Firm* — Quarles & Brady LLP

(57) ABSTRACT

An ultrasonic welding device includes a sonotrode emitting longitudinal vibrations in the direction of a longitudinal sonotrode axis which comprises a work surface on a sonotrode head and an anvil. A weldment accommodation for a weld deposit is between the work surface 'p' and a counterface of the anvil. The ultrasonic welding device includes a stop device for defining the welding position with respect to the work surface. The counterface is disposed at an inclination α towards the longitudinal sonotrode axis such that when the counterface is inclined downward towards a vibration node adjacent to the work surface, distance a between the work surface and the counterface continuously increases towards the vibration node, and when the counterface is inclined upward towards a vibration node adjacent to the work surface distance a is essentially constant.

7 Claims, 3 Drawing Sheets

(58) Field of Classification Search
USPC .............................................. 228/110.1, 1.1
See application file for complete search history.

(56) References Cited

U.S. PATENT DOCUMENTS

| | | | |
|---|---|---|---|
| 2004/0112547 A1* | 6/2004 | Tamamoto ............ | B29C 65/081 |
| | | | 156/580.1 |
| 2005/0227429 A1* | 10/2005 | Minamitani ...... | H01L 21/67144 |
| | | | 438/222 |
| 2011/0259526 A1* | 10/2011 | Eder ...................... | B23K 20/10 |
| | | | 156/510 |
| 2019/0054645 A1* | 2/2019 | Wagner ................ | B23K 20/004 |

FOREIGN PATENT DOCUMENTS

| | | |
|---|---|---|
| DE | 10208305 C1 | 8/2003 |
| DE | 102015206866 B3 | 7/2016 |
| DE | 102016207922 A1 | 11/2017 |
| WO | 2005051589 A1 | 6/2005 |
| WO | 2017145989 A1 | 8/2017 |

* cited by examiner ized on a sonotrode head and comprises an anvil, a weldment accommodation for housing a weld deposit being realized between the work surface of the sonotrode and a counterface of the anvil which is disposed opposite the work surface, the ultrasonic welding device comprising a stop device for defining the welding position P of the weld deposit in the direction of the longitudinal sonotrode axis.

ULTRASONIC WELDING DEVICE

CROSS-REFERENCE TO RELATED APPLICATIONS

This application represents the national stage entry of PCT International Patent Application No. PCT/EP2018/077621 filed Oct. 10, 2018, which claims priority to German Patent Application No. DE 10 2017 220 079.0 filed Nov. 10, 2017. The contents of these applications are hereby incorporated by reference as if set forth in their entirety herein.

The present disclosure relates to an ultrasonic welding device comprising a sonotrode emitting longitudinal vibrations in the direction of a longitudinal sonotrode axis which comprises a work surface realized on a sonotrode head and comprises an anvil, a weldment accommodation for housing a weld deposit being realized between the work surface of the sonotrode and a counterface of the anvil which is disposed opposite the work surface, the ultrasonic welding device comprising a stop device for defining the welding position P of the weld deposit in the direction of the longitudinal sonotrode axis.

Ultrasonic welding devices of the make mentioned above are used in particular for pairs of ultrasonic welding tongs to realize end weldings on metal tubes as used for fluid pipes on cooling units, in particular air conditioners or refrigerators. End weldings of this type are realized after filling a cooling circuit, which comprises the fluid pipe, with a cooling agent in such a manner that a filling valve, which is disposed on a free end of the tube, is disconnected from the tube end at the same time the end weldings are disconnected.

To enable an exact positioning of the weld deposit, which is formed as a tube in the usage detailed above, between the work surface of the sonotrode and the counterface of the anvil, a stop device is provided on a housing of the ultrasonic welding device which is in contact with the tube in the welding position so that the axial position of the tube is defined in the direction of the longitudinal sonotrode axis.

It has emerged in practice that despite the arrangement of the stop device, it cannot be ensured that the weld deposit abuts against the stop device while vibration is applied to the weld deposit if the operator of the ultrasonic welding device does not exert a force on the weld deposit at the same time as the vibration is applied to the weld deposit, thus pressing the weld deposit against the stop device. Due to this manually created clamping force, it cannot always be ensured that the weldings can be processed in a truly replicable manner.

The object of the disclosure at hand is therefore to propose an ultrasonic welding device which enables replicating the execution of weldings in an improved manner.

In order to attain this object, the ultrasonic welding device according to the disclosure has the features of claim 1.

According to the disclosure, the counterface is disposed at an inclination towards the longitudinal sonotrode axis in such a manner that when the counterface is inclined downward towards a vibration node of the sonotrode adjacent to the work surface, the distance between the work surface and the counterface continuously increases towards the vibration node SK, and when the counterface is inclined upward towards a vibration node SK adjacent to the work surface, the distance between the work surface and the counterface is essentially constant.

The disclosure is based on the realization that the longitudinal vibrations of a sonotrode will induce a translational motion of a body adhering to the sonotrode. The alternative embodiments of the ultrasonic welding device according to the disclosure further cause a weld deposit, which is housed between the work surface and the counterface in the weldment accommodation, i.e., in particular the weld deposit realized as a tube, to perform a translational motion in the direction of the stop device for which reason even if an operator does not exert a clamping force on the weld deposit in the direction of the stop device, it is ensured in any case that the weld deposit constantly abuts against the stop device in its position during the entire welding process, for which reason replicable welding processes are ensured at least regarding the welding position of the welding deposit.

The solution according to the disclosure defines alternative subject matters of the disclosure depending on whether the counterface is inclined downward towards a vibration node of the sonotrode adjacent to the work surface, in which case, according to the disclosure, the distance between the work surface and the counterface continuously increases towards the vibration node SK, or whether the counterface is inclined upward towards a vibration node SK adjacent to the work surface, in which case, according to the disclosure, the distance between the work surface and the counterface is essentially constant.

According to the solution of the disclosure, "essentially constant" means that slight deviations are allowed in so far as they do not compromise the advantage of the disclosure, meaning a translational motion realized in the direction of the stop device.

In a first embodiment of the ultrasonic welding device, the work surface is essentially disposed parallel to the longitudinal sonotrode axis when the counterface is inclined downward towards a vibration node of the sonotrode adjacent to the work surface.

According to the preceding embodiment, "essentially disposed parallel" means that slight deviations are allowed in so far as they do not compromise the advantage of the disclosure, meaning a translational motion realized in the direction of the stop device.

In a further advantageous embodiment of the ultrasonic welding device, the work surface is disposed parallel to the counterface when the counterface is inclined upward towards a vibration node of the sonotrode adjacent to the work surface.

For achieving the parallel arrangement of the work surface, the sonotrode head preferably has a cross-sectional height which increases towards a free sonotrode end in the preceding embodiment.

The inclination of the counterface is preferably less than 1° with respect to the longitudinal sonotrode axis.

More preferably, the inclination of the counterface is less than 0.5° with respect to the longitudinal sonotrode axis and even more preferably, the inclination of the counterface is greater than 0.1° and less than 0.3°.

In the following, an embodiment of the disclosure is further described by means of the drawing.

Figure 1:
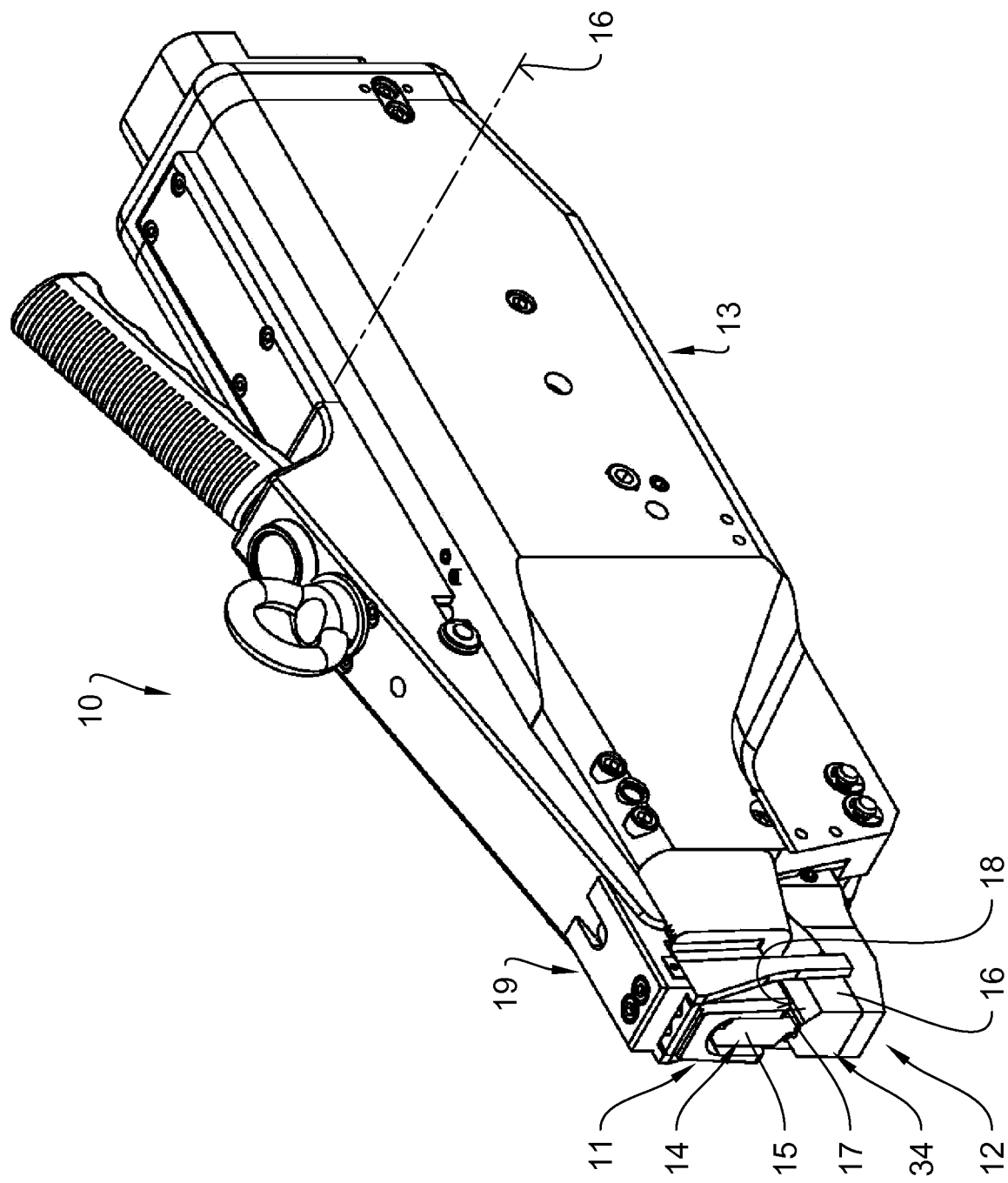
FIG. 1 shows an isometric view of welding tongs provided with an ultrasonic welding device and a stop device which is disposed on a weldment accommodation formed between a work surface of a sonotrode and a counterface of an anvil.

FIG. 1 shows in an isometric view an ultrasonic welding device 10 realized as ultrasonic welding tongs and having an upper tong part 11 and a lower tong part 12 which are disposed in a shared tong casing 13. The upper tong part 11 comprises a sonotrode 14 of the ultrasonic welding device 34, illustrated in particular in FIG. 4 without the tong casing 13, said sonotrode 14 being disposed with a sonotrode head 15 in such a manner opposite an anvil 16 of the ultrasonic welding device 34 which is realized on a lower tong part 12 that a weldment accommodation 19, shown in particular in FIG. 2, is formed between a work surface 17 of the sonotrode 14 and a counterface 18 of the anvil 16.

In the case of the illustrated exemplary embodiment, the anvil 16 is pivotable around a pivot axis 16, which is realized in the rearward part of the tong casing 13, against the sonotrode head 15 of the sonotrode 14 by means of an actuation device (not further illustrated) in such a manner that the counterface 18 realized on the anvil 16 can be moved against the work surface 17 of the sonotrode 14 emitting longitudinal vibrations.

Figure 2:
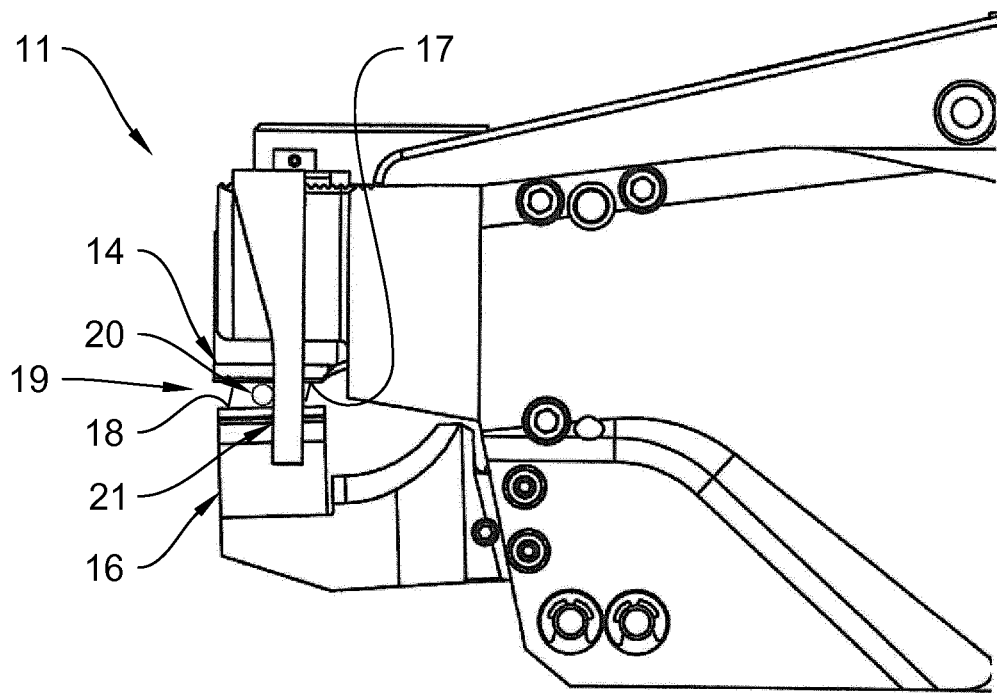
FIG. 2 shows the weldment accommodation illustrated in FIG. 1 in an enlarged side view.

As illustrated in FIG. 2, the weldment accommodation 19 realized between the work surface 17 of the sonotrode 14 and the counterface 18 of the anvil 16 serves for housing a weld deposit 20 realized as a small metal tube in the case at hand. As can be further seen from FIG. 2, the upper tong part 11 is provided with a stop device 21, which is changeable in its relative position in the direction of the longitudinal sonotrode axis 26.

Figure 3:
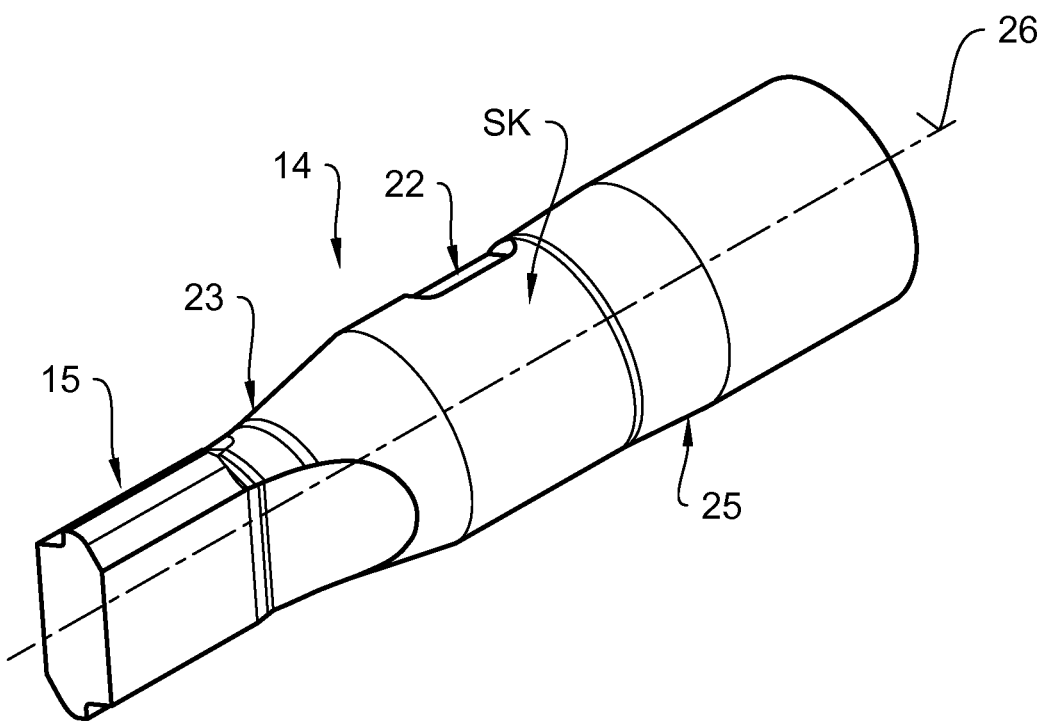
FIG. 3 shows a sonotrode in an isometric view.

FIG. 3 shows a conventionally realized sonotrode 14 comprising a sonotrode head 15 which is connected to a sonotrode body 25 via a sonotrode neck 23. The sonotrode head 15 comprises a constant cross section having two work surfaces 17 which are disposed parallel to each other, for which reason the sonotrode 14 can be rotated by 180° around the longitudinal sonotrode axis 26 in a known manner after an abrasion of the first work surface 17 in order to subsequently dispose the second work surface 17 opposite the counterface 18 of the anvil 16 (see FIG. 2).

Adjacent to the sonotrode head 15, the sonotrode 14 has a vibration node SK having an amplitude of the longitudinal vibrations approaching zero, said vibration node SK being realized in a retaining portion 22 of the sonotrode 14 in the illustrated embodiment and serving to support the sonotrode against a bearing (not further illustrated).

Figure 4:
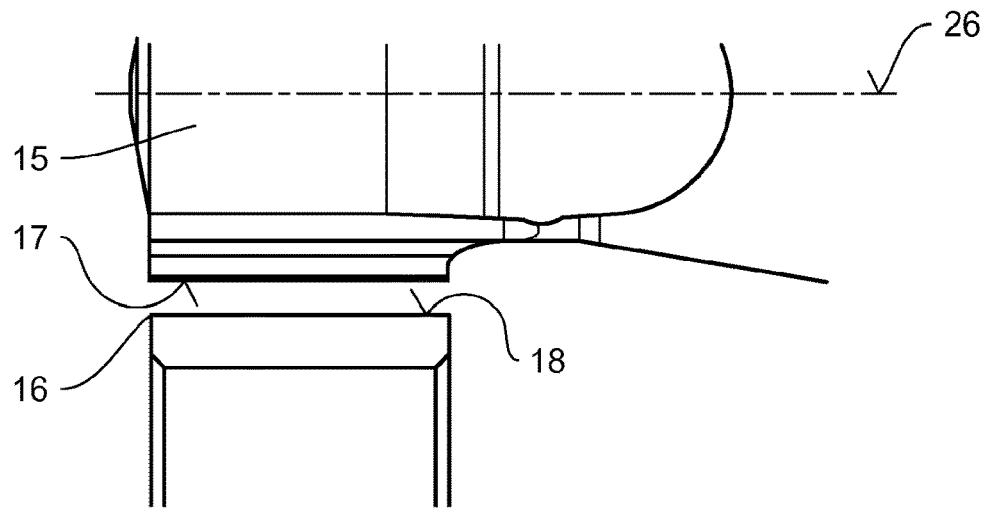
FIG. 4 shows an arrangement of a sonotrode according to the state of the art to which vibrations are applied along its longitudinal axis and which has a work surface disposed parallel to the longitudinal axis.

A conventional sonotrode arrangement in an ultrasonic welding device is illustrated in FIG. 4, in which both the work surface 17 of the sonotrode 14 and the counterface 18 of the anvil 16 disposed opposite the work surface 17 are disposed parallel to the longitudinal sonotrode axis 26.

Figure 5:
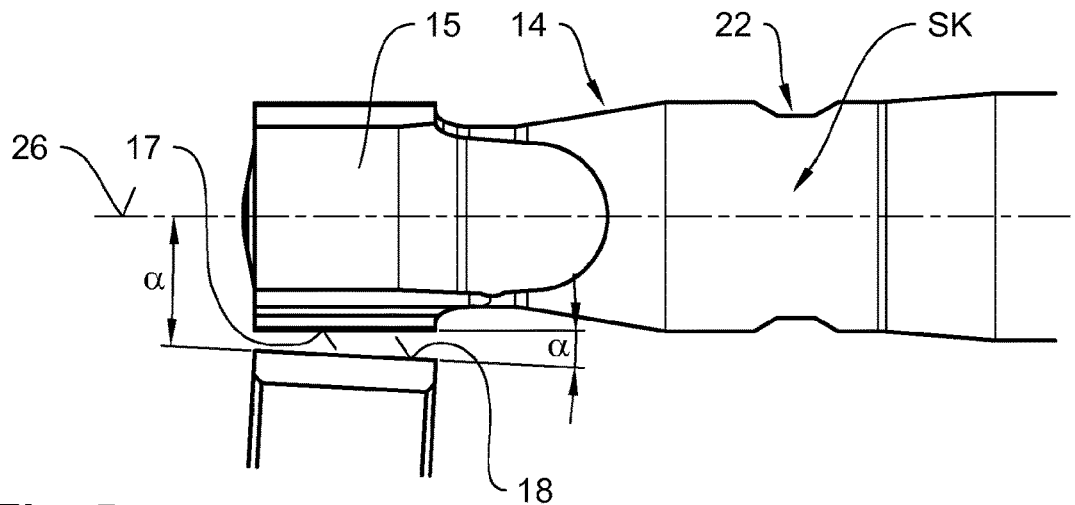
FIG. 5 shows a sonotrode arrangement according to a first embodiment of the ultrasonic welding device according to the disclosure.

In a first embodiment of the disclosure, FIG. 5 shows a sonotrode arrangement of an ultrasonic welding device 10 whose counterface 18 is disposed at an inclination α towards the longitudinal sonotrode axis 26 in such a manner that the counterface 18 is inclined downward towards the vibration node SK adjacent to the work surface 17 and whose distance a between the work surface 17 and the counterface 18 continuously increases towards the vibration node SK.

Figure 6:
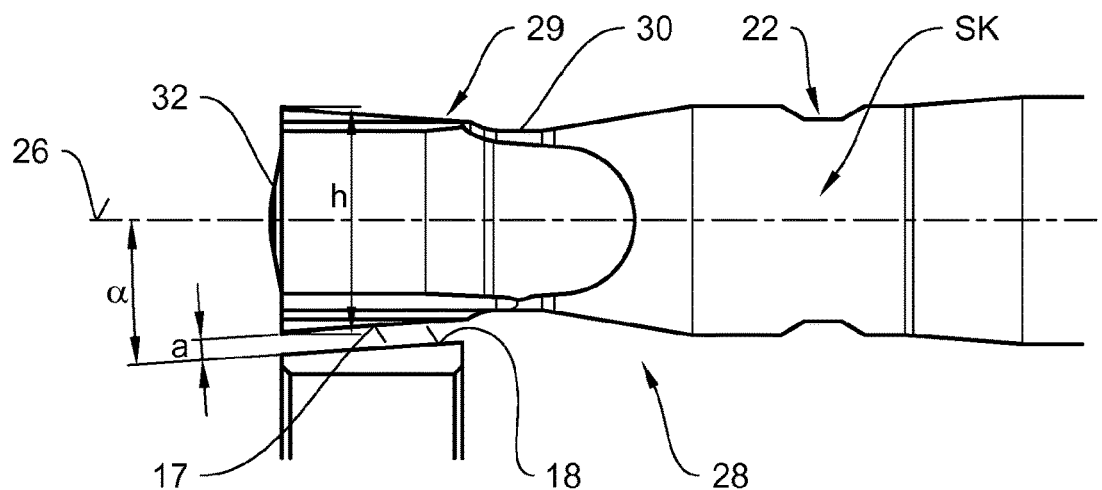
FIG. 6 shows a sonotrode arrangement according to a second embodiment of the ultrasonic welding device according to the disclosure.

The sonotrode arrangement of a further embodiment of the disclosure illustrated in FIG. 6 is provided with a sonotrode 28 which, unlike sonotrode 14 illustrated in FIGS. 3-5, has a sonotrode head 29 which is connected to a sonotrode body 31 via a sonotrode neck 30 and which does not have a constant cross section but a cross-sectional height h which increases from a sonotrode neck 30 towards a free sonotrode end 32.

The counterface 18 of sonotrode 28 is disposed at an inclination α towards the longitudinal sonotrode axis 26 in such a manner that the counterface 18 is inclined upward towards the vibration node SK adjacent to the work surface 17 and the distance a between the work surface 17 and the counterface 18 is essentially constant. In particular, the counterface 18 is disposed parallel to the work surface 17 in the case of the illustrated exemplary embodiment.

The invention claimed is:

1. An ultrasonic welding device comprising a sonotrode emitting longitudinal vibrations in the direction of a longitudinal sonotrode axis which comprises a work surface realized on a sonotrode head and comprises an anvil, a weldment accommodation for housing a weld deposit being realized between the work surface and a counterface of the anvil which is disposed opposite the work surface, the ultrasonic welding device comprising a stop device for defining the welding position P of the weld deposit with respect to the work surface in the direction of the longitudinal sonotrode axis, wherein
the counterface is disposed at an inclination α towards the longitudinal sonotrode axis in such a manner that when the counterface is inclined downward towards a vibration node of the sonotrode adjacent to the work surface, distance a between the work surface and the counterface continuously increases towards the vibration node SK, and when the counterface is inclined upward towards a vibration node SK adjacent to the work surface, distance a between the work surface and the counterface is essentially constant.

2. The ultrasonic welding device according to claim 1, wherein when the counterface is inclined downward towards a vibration node SK of the sonotrode adjacent to the work surface, the work surface is essentially disposed parallel to the longitudinal sonotrode axis.

3. The ultrasonic welding device according to claim 1, wherein when the counterface is inclined upward towards a vibration node SK of the sonotrode adjacent to the work surface, the work surface is disposed parallel to the counterface.

4. The ultrasonic welding device according to claim 3, wherein the sonotrode head has a cross-sectional height h, which increases towards a free sonotrode end, for achieving a parallel arrangement of the work surface.

5. The ultrasonic welding device according to claim 1, wherein inclination α of the counterface is less than 1° with respect to the longitudinal sonotrode axis.

6. The ultrasonic welding device according to claim 5, wherein inclination α of the counterface is less than 0.5° with respect to the longitudinal sonotrode axis.

7. The ultrasonic welding device according to claim 6, wherein work surface angle α is greater than 0.1° and less than 0.3°.

\* \* \* \* \*